(12) United States Patent
Miyake

(10) Patent No.: US 10,936,266 B2
(45) Date of Patent: Mar. 2, 2021

(54) SERVER AND NON-TRANSITORY COMPUTER-READABLE MEDIUM STORING COMPUTER-READABLE INSTRUCTIONS FOR SERVER

(71) Applicant: BROTHER KOGYO KABUSHIKI KAISHA, Nagoya (JP)

(72) Inventor: Takeshi Miyake, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 99 days.

(21) Appl. No.: 16/423,545

(22) Filed: May 28, 2019

(65) Prior Publication Data

US 2019/0361640 A1  Nov. 28, 2019

(30) Foreign Application Priority Data

May 28, 2018  (JP) .................................. 2018-101639

(51) Int. Cl.
*G06F 3/12* (2006.01)
*H04N 1/00* (2006.01)

(52) U.S. Cl.
CPC ............ *G06F 3/129* (2013.01); *G06F 3/1205* (2013.01); *G06F 3/1232* (2013.01); *G06F 3/1236* (2013.01); *H04N 1/00217* (2013.01)

(58) Field of Classification Search
CPC ...... G06F 3/129; G06F 3/1205; G06F 3/1232; G06F 3/1236; G06F 3/123; H04N 1/00217

See application file for complete search history.

(56) References Cited

U.S. PATENT DOCUMENTS

| | | | |
|---|---|---|---|
| 2014/0268236 A1* | 9/2014 | Ohara | G06F 3/1224 358/1.15 |
| 2014/0280782 A1 | 9/2014 | Ohara | |
| 2016/0224288 A1* | 8/2016 | Nogawa | G06F 3/1236 |
| 2016/0337393 A1 | 11/2016 | Tsuchitoi | |

FOREIGN PATENT DOCUMENTS

| | | |
|---|---|---|
| JP | 2014-178988 A | 9/2014 |
| JP | 2014-179017 A | 9/2014 |
| JP | 2016-212832 A | 12/2016 |

* cited by examiner

*Primary Examiner* — Neil R McLean
(74) *Attorney, Agent, or Firm* — Scully, Scott, Murphy & Presser, PC

(57) ABSTRACT

A server may send a sending request to a communication device via the Internet, the sending request being a signal for requesting the communication device to send a first setting value corresponding to a first setting item of the communication device; after the sending request has been sent to the communication device, receive the first setting value from the communication device via the Internet; determine whether the received first setting value satisfies a first predetermined condition; and in a case where it is determined that the received first setting value does not satisfy the first predetermined condition, send a first changing request to the communication device via the Internet, the first changing request being a signal for requesting the communication device to change a specific setting value corresponding to a specific setting item of the communication device.

19 Claims, 7 Drawing Sheets

(First Embodiment)

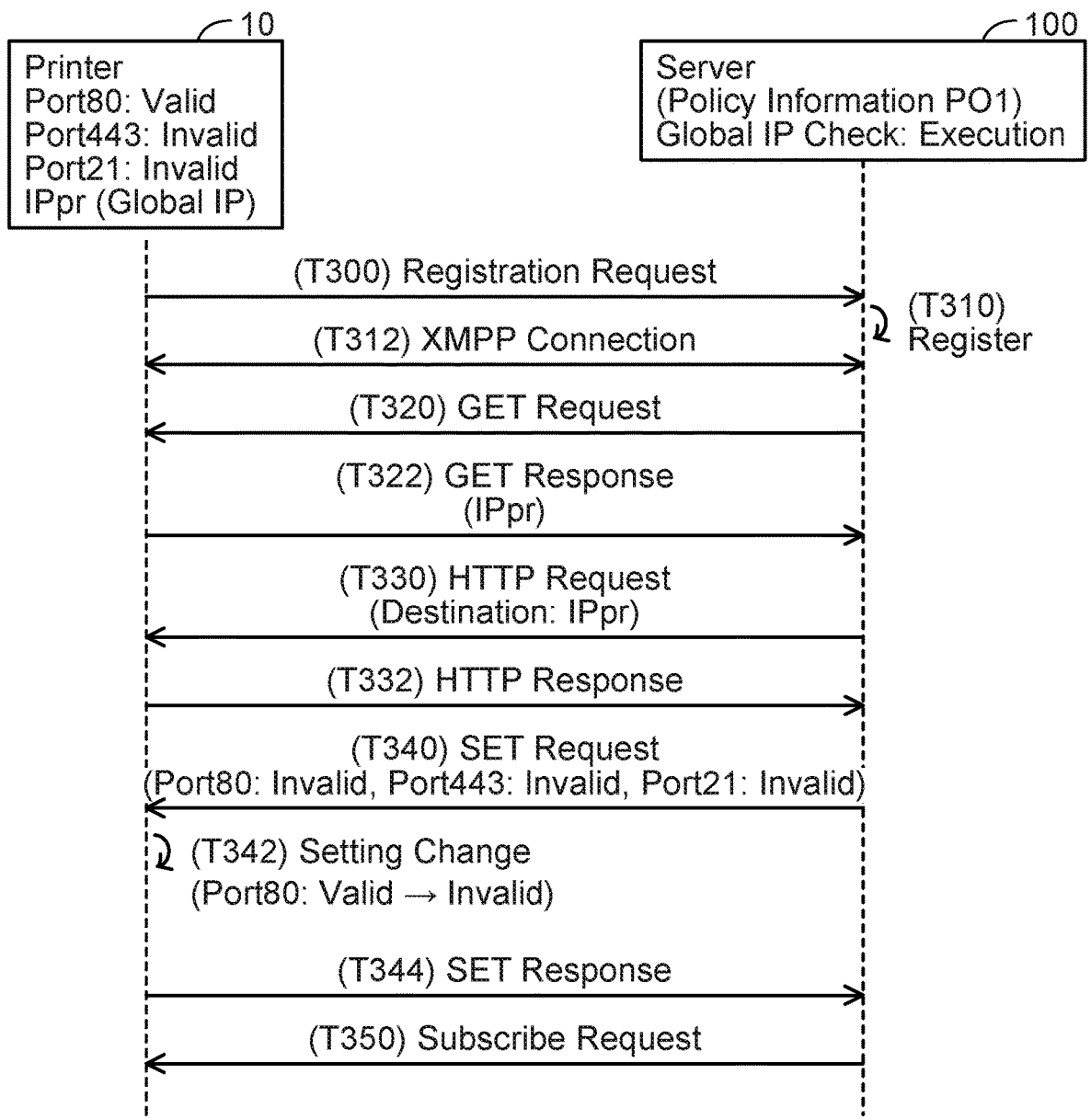

SERVER AND NON-TRANSITORY COMPUTER-READABLE MEDIUM STORING COMPUTER-READABLE INSTRUCTIONS FOR SERVER

CROSS-REFERENCE TO RELATED APPLICATION

This application claims priority to Japanese Patent Application No. 2018-101639 filed on May 28, 2018, the contents of which are hereby incorporated by reference into the present application.

TECHNICAL FIELD

The disclosure herein discloses a technique relating to a server capable of changing a setting value of a communication device.

DESCRIPTION OF RELATED ART

A system provided with a printer, a relay server and a terminal device is known. In a case of receiving a SUB command from the terminal device, the relay server sends the SUB command to the printer. The SUB command is, for example, a command requesting a number of printed sheets to be checked at 40 minutes intervals and requesting information indicating a number of printed sheets to be sent when it is detected that the number of printed sheets has changed. Upon receiving the information indicating the number of printed sheets from the printer, the relay server sends the information to the terminal device.

SUMMARY

The above technique teaches nothing about changing a setting value of the printer. The disclosure herein provides a technique capable of appropriately switching whether or not to change a setting value of a communication device.

A non-transitory computer-readable medium storing computer-readable instructions for a server is disclosed herein. The computer-readable instructions, when executed by a processor of the server, may cause the server to: send a sending request to a communication device via the Internet, the sending request being a signal for requesting the communication device to send a first setting value corresponding to a first setting item of the communication device; after the sending request has been sent to the communication device, receive the first setting value from the communication device via the Internet; determine whether the received first setting value satisfies a first predetermined condition; and in a case where it is determined that the received first setting value does not satisfy the first predetermined condition, send a first changing request to the communication device via the Internet, the first changing request being a signal for requesting the communication device to change a specific setting value corresponding to a specific setting item of the communication device, wherein in a case where it is determined that the received first setting value satisfies the first predetermined condition, the first changing request is not sent.

The above server itself and a method implemented by the server are also novel and useful. Moreover, a communication system comprising the above server and communication device is also novel and useful.

BRIEF DESCRIPTION OF THE DRAWINGS

FIG. 7 shows a sequence diagram of a third embodiment.

EMBODIMENTS

Figure 1:
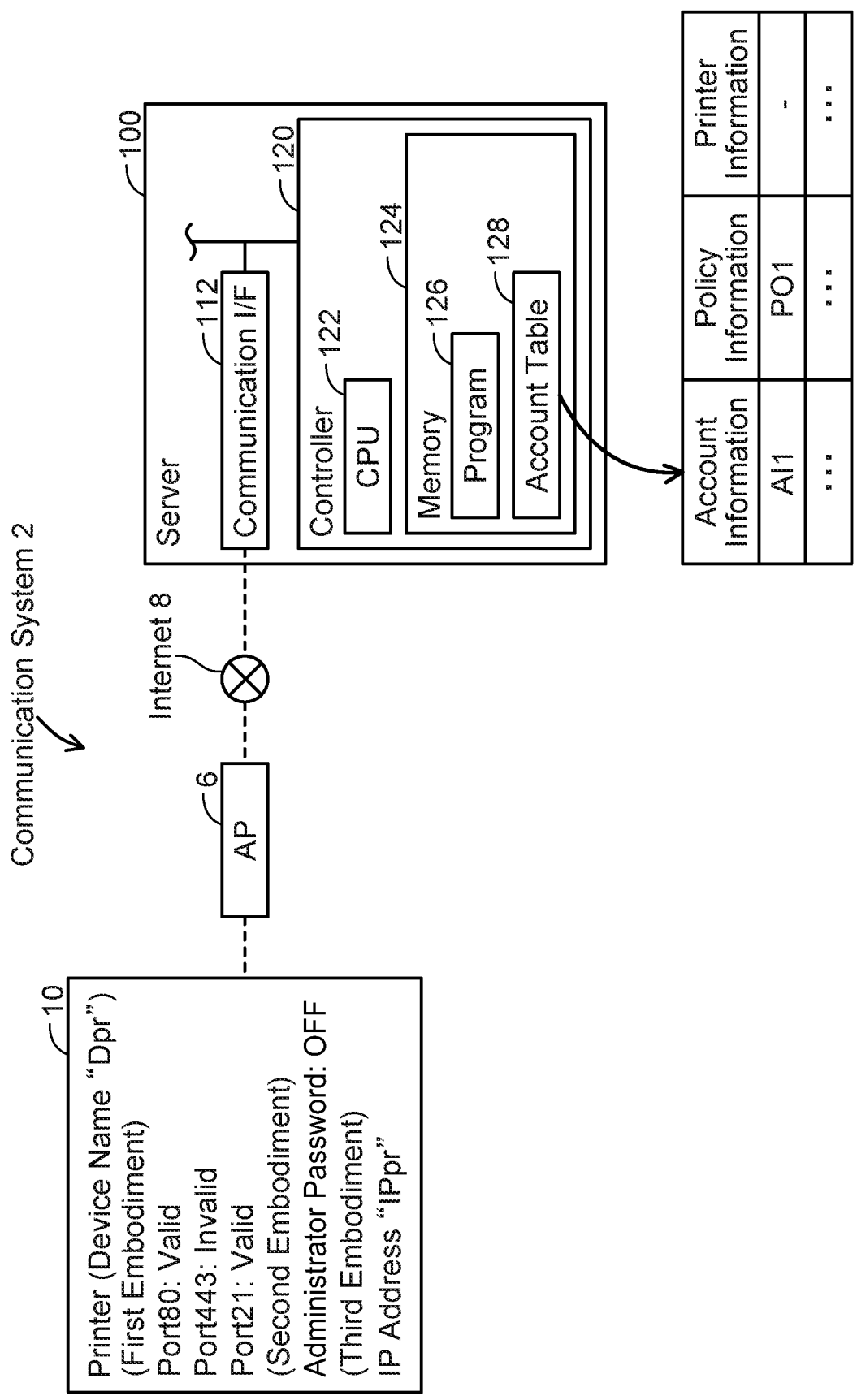
FIG. 1 shows a configuration of a communication system.

First Embodiment (Configuration of Communication System 2; FIG. 1)

As shown in FIG. 1, a communication system 2 comprises a printer 10 and a server 100. The printer 10 has already established a wireless connection with an AP 6 and is capable of communicating with a device (e.g., the server 100) on the Internet 8 via the AP 6. Moreover, in a variant, the printer 10 may be capable of communicating with a device on the Internet 8 by using wired communication.

(Configuration of Printer 10)

The printer 10 is a peripheral device capable of executing a print function (e.g., a peripheral device of a PC or the like that is not shown) and has a device name "Dpr". The printer 10 stores various setting values corresponding to various setting items. In the present embodiment, the printer 10 stores a plurality of setting values corresponding to a plurality of communication ports which is a plurality of setting items. The plurality of communication ports includes a port 80 for executing communication according to HTTP (abbreviation of Hyper Text Transfer Protocol), a port 443 for executing communication according to HTTPS (abbreviation of Hyper Text Transfer Protocol Secure), and a port 21 for executing communication according to FTP (abbreviation of File Transfer Protocol). In a stage of shipping the printer 10 (i.e., in default setting values), the printer 10 stores a setting value "valid" corresponding to the port 80, a setting value "invalid" corresponding to the port 443, and a setting value "invalid" corresponding to the port 21. Here, the setting value "valid" means that a process in accordance with a signal whose destination is the corresponding port is executed, and the setting value "invalid" means that a process in accordance with a signal whose destination is the corresponding port is not executed (i.e., the signal is ignored). In a variant, the default setting values corresponding to the ports are not limited to the above examples, and all the setting values may be "invalid" (or "valid"), for example. Further, setting values corresponding to other ports different from the ports 80, 443, 21 may be stored.

(Configuration of Server 100)

The server 100 is a server for providing services to a plurality of printers including the printer 10. The services include, for example, a service of receiving from a printer information indicating a remaining amount of a consumable article and shipping a new consumable article to a user of the printer in a case where the remaining amount of the consumable article is equal to or below a predetermined value.

The server 100 comprises a communication I/F 112 and a controller 120. The communication I/F 112 is connected to the Internet 8. The controller 120 comprises a CPU 122 and a memory 124. The memory 124 is constituted of a volatile memory, a non-volatile memory, and the like. The CPU 122 executes various processes in accordance with a program 126 stored in the memory 124.

The memory 124 further stores an account table 128. In the account table 128, account information, policy information, and printer information are associated with one another. The account information includes a user ID and a password for an administrator of a printer to access the server 100. The policy information is information indicating an administrator policy related to security of the printer. In the present embodiment, the policy information indicates a plurality of setting values corresponding to the plurality of communication ports 80, 443, 21. The printer information is information related to the printer and includes, for example, a device name of the printer, a part number of a consumable article used in the printer, an access token, information on a shipping destination of the consumable article (i.e., user name and address), etc. An administrator of the printer 10 uses a terminal device of the administrator to store account information AI1 and policy information PO1 in advance in the account table 128. The printer information of the printer 10 is registered in a process of FIG. 2 to be described later.

Figure 2:
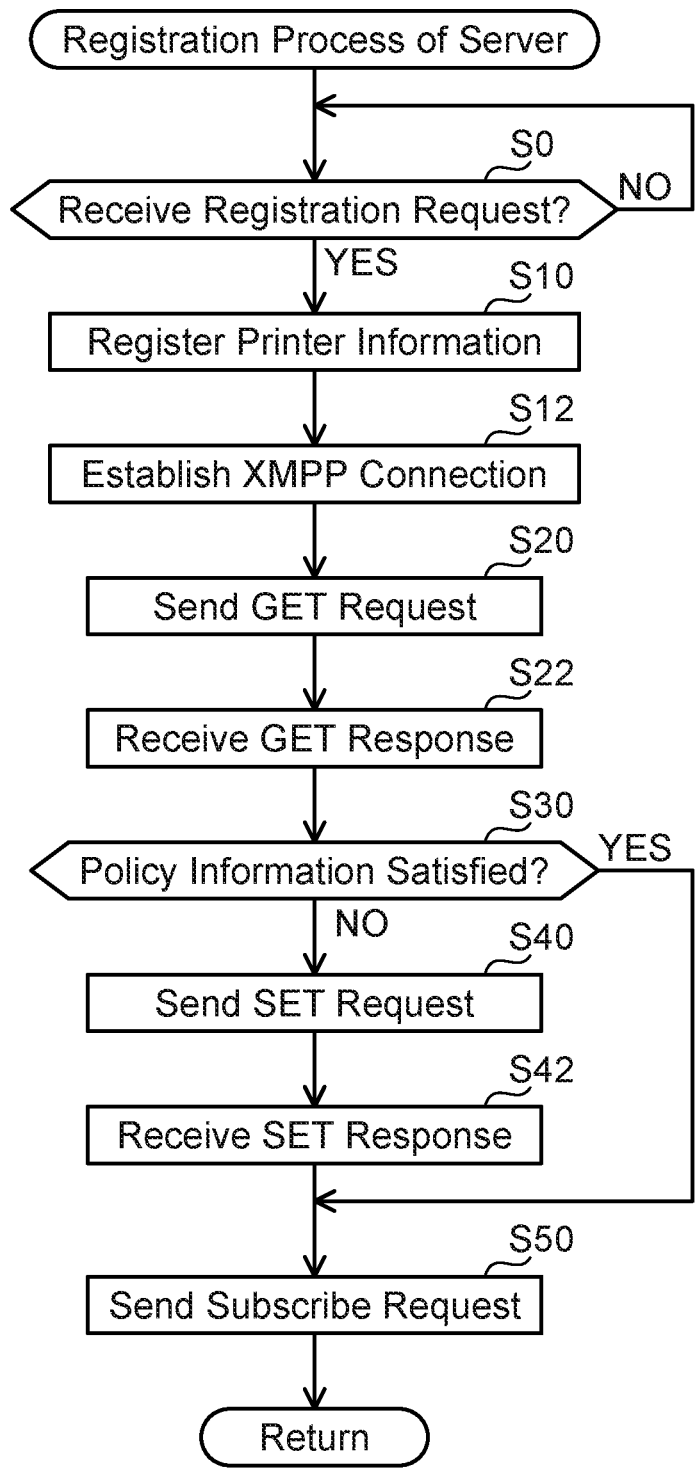
FIG. 2 shows a flowchart of a registration process of a server.

(Registration Process of Server 100; FIG. 2)

Next, a registration process executed by the CPU 122 of the server 100 in accordance with the program 126 will be described with reference to FIG. 2. In all of communications described below, the communication I/F 112 of the server 100 and the Internet 8 are used. Thus, descriptions "via the communication I/F 112" and "via the Internet 8" may be omitted below.

In S0, the CPU 122 monitors whether a registration request is received from the printer 10. The registration request is a signal requesting registration of printer information and includes printer information (e.g., the device name "Dpr"). Here, the CPU 122 had received a login request including the account information AI1 before receiving the registration request, as a result of which a login state using the account information AI1 is already built. In a case of receiving the registration request from the printer 10 (YES in S0), the CPU 122 proceeds to S10.

In S10, the CPU 122 stores (i.e., registers), in the account table 128, the printer information in association with the account information AI1 that was used for the login.

In S12, the CPU 122 establishes an XMPP (abbreviation of eXtensible Messaging and Presence Protocol) connection (i.e., a so-called constant connection) between the printer 10 and the server 100 via the Internet 8. Thereby, even if the server 100 does not receive a signal from the printer 10, the server 100 can send a signal to the printer 10 over a firewall of a LAN (i.e., the AP 6) to which the printer 10 belongs.

In S20, the CPU 122 sends, to the printer 10, a GET request that requests sending of the plurality of setting values corresponding to the plurality of communication ports 80, 443, 21 of the printer 10 by using the XMPP connection (i.e., without receiving a signal from the printer 10).

In S22, the CPU 122 receives, from the printer 10, a GET response including the plurality of setting values corresponding to the plurality of communication ports 80, 443, 21.

In S30, the CPU 122 determines whether the plurality of setting values received in S22 satisfies the policy information PO1. Specifically, the CPU 122 first acquires, from the account table 128, the policy information PO1 associated with the account information AI1 that was used for the login. Then, the CPU 122 determines whether the plurality of setting values received in S22 matches the plurality of setting values indicated by the policy information PO1. In a case where the former plurality of setting values matches the latter plurality of setting values, the CPU 122 determines that the policy information PO1 is satisfied (YES in S30), skips S40 and S42, and proceeds to S50. On the other hand, in a case where any of the former plurality of setting values does not match the latter plurality of setting values, the CPU 122 determines that the policy information PO1 is not satisfied (NO in S30) and proceeds to S40.

In S40, the CPU 122 uses the XMPP connection to send, to the printer 10, a SET request for changing the setting value(s) that was determined not to satisfy the policy information PO1.

In S42, the CPU 122 receives, from the printer 10, a SET response indicating that the changing of the setting value(s) has been completed.

In S50, the CPU 122 sends a Subscribe request to the printer 10 by using the XMPP connection. The Subscribe request is a signal that requests sending of changed setting value(s) corresponding to the communication port(s) in a case where any of the plurality of setting values corresponding to the plurality of communication ports 80, 443, 21 of the printer 10 was changed. When S50 ends, the CPU 122 returns to S0.

Figure 3:
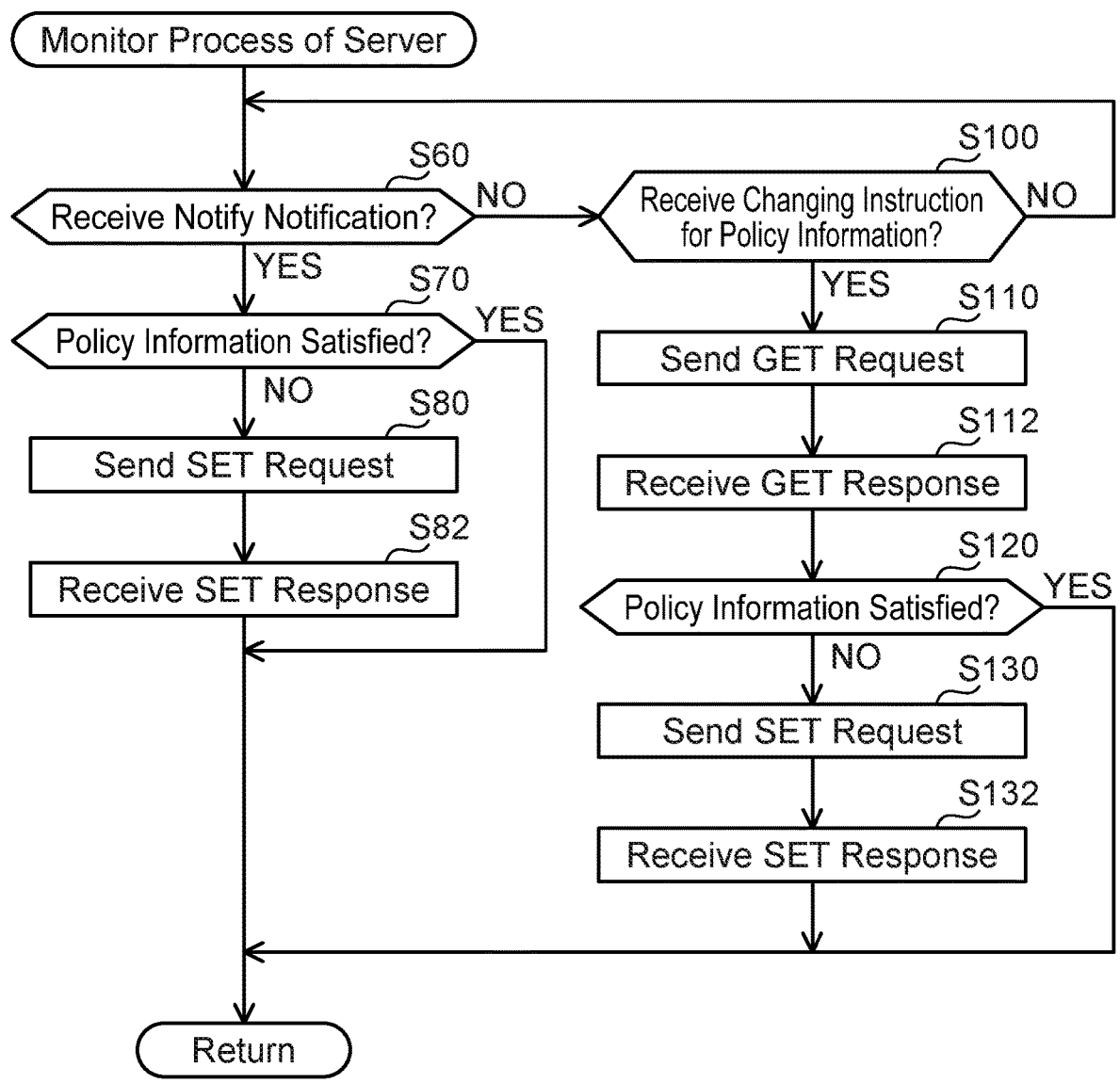
FIG. 3 shows a flowchart of a monitor process of the server.

(Monitor Process of Server 100; FIG. 3)

In S60, the CPU 122 monitors whether a Notify notification is received from the printer 10. The Notify notification is a notification sent from the printer 10 in response to the Subscribe request sent in S50 of FIG. 2 and includes the device name "Dpr" of the printer 10 and the changed setting value(s) corresponding to the communication port(s). In case of receiving the Notify notification from the printer 10, the CPU 122 determines YES in S60 and proceeds to S70.

In S70, the CPU 122 determines whether the setting value(s) received in S60 satisfies the policy information PO1. Specifically, the CPU 122 first acquires, from the account table 128, the policy information PO1 associated with the printer information including the device name "Dpr" received in S60. Then, the CPU 122 determines whether the changed setting value(s) corresponding to the communication port(s) received in S60 matches the corresponding setting value(s) corresponding to the communication port(s) indicated by the policy information PO1. In a case where the former setting value(s) matches the latter setting value(s), the CPU 122 determines that the policy information PO1 is satisfied (YES in S70), skips S80 and S82, and returns to S60. On the other hand, in a case where the former setting value(s) does not match the latter setting value(s), the CPU 122 determines that the policy information PO1 is not satisfied (NO in S70) and proceeds to S80.

S80 and S82 are the same as S40 and S42 of FIG. 2. When S82 ends, the CPU 122 returns to S60.

Further, the CPU 122 executes monitoring of S100 in parallel with the monitoring of S60. In S100, the CPU 122 monitors whether a changing instruction for the policy information PO1 is received from the terminal device of the administrator of the printer 10. In a case of receiving the changing instruction for the policy information PO1 from the terminal device, the CPU 122 determines YES in S100 and proceeds to S110.

S110 to S132 are the same as S20 to S42 of FIG. 2. When S132 ends, the CPU 122 returns to S60.

Figure 4:
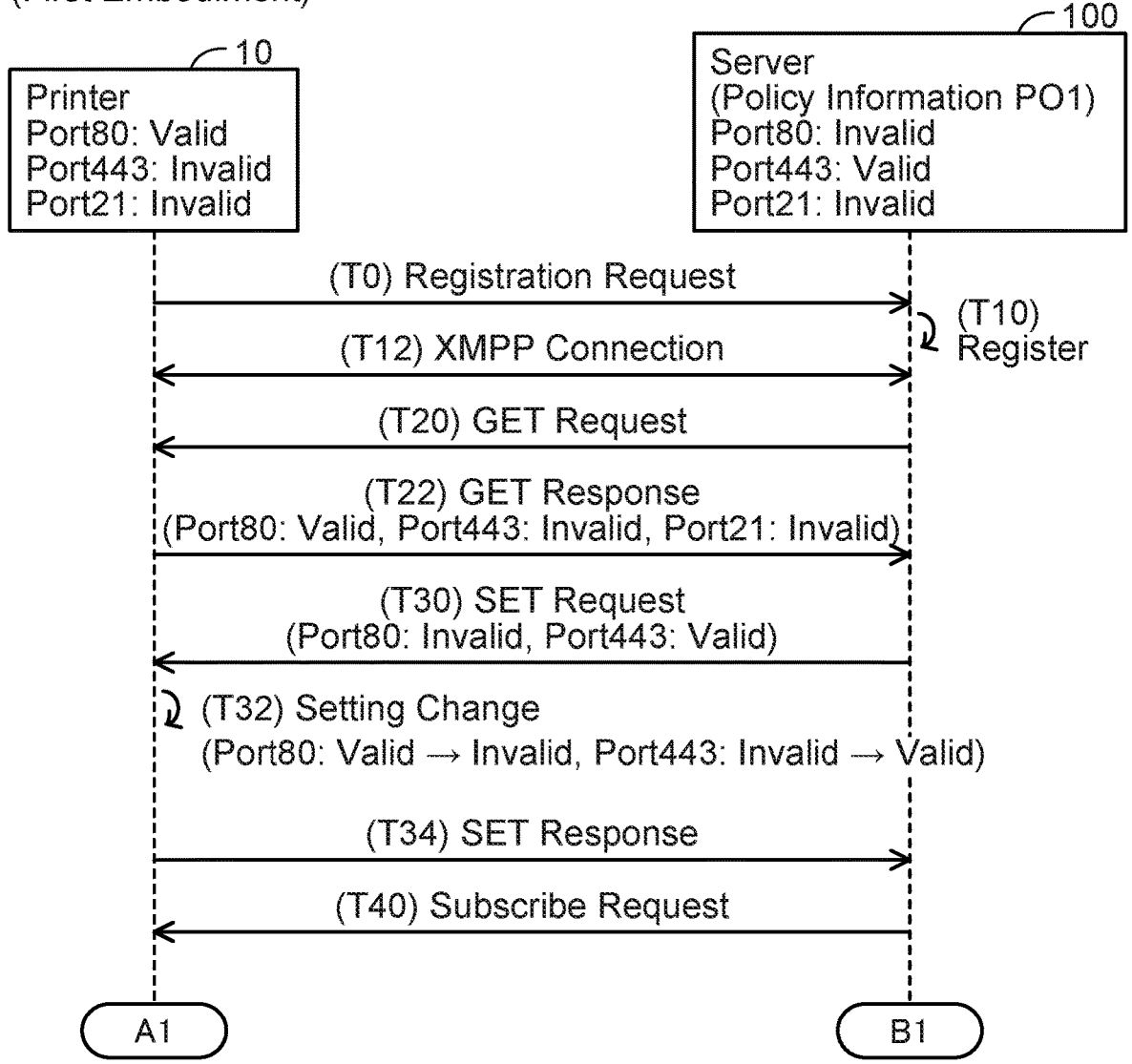
FIG. 4 shows a sequence diagram of a first embodiment.

(Specific Case; FIG. 4)

Next, a specific case realized by the present embodiment will be described with reference to FIG. 4. In an initial state of FIG. 4, each of the plurality of setting values corresponding to the plurality of communication ports 80, 443, 21 of the printer 10 is the default value (i.e., the port 80 "valid", the port 443 "invalid", and the port 21 "invalid"). Further, the policy information PO1 of the server 100 includes the port 80 "invalid", the port 443 "valid", and the port 21 "invalid". For example, since relatively secure communication is executed with HTTPS, the administrator determines the policy information PO1 including the port 443 "valid". On the other hand, with regards to HTTP and FTP, the administrator thinks there is a possibility of the printer 10 being accessed in an unauthorized manner by a third party, and therefore determines the policy information PO1 including the port 80 "invalid" and the port 21 "invalid". However, how the policy information PO1 is determined is at administrator's discretion, and policy information PO1 different from that of the case of FIG. 4 may be determined.

Upon receiving the registration request from the printer 10 in T0 (YES in S0 of FIG. 2), the server 100 registers the printer information in T10 (S10) and establishes an XMPP connection with the printer 10 in T12 (S12). Next, the server 100 sends a GET request to the printer 10 by using the XMPP connection in T20 (S20) and receives a GET response from the printer 10 in T22 (S22). The GET response includes the port 80 "valid", the port 443 "invalid", and the port 21 "invalid".

The server 100 determines that the port 80 "valid" received in T22 does not match the port 80 "invalid" in the policy information PO1, and further determines that the port 443 "invalid" received in T22 does not match the port 443 "valid" in the policy information PO1 (NO in S30). In this case, in T30, the server 100 sends a SET request including the port 80 "invalid" and the port 443 "valid" to the printer 10 (S40).

Upon receiving the SET request from the server 100 in T30, the printer 10 executes a setting change in T32 in accordance with the SET request. Specifically, the printer 10 changes the setting value corresponding to the port 80 from "valid" to "invalid" and changes the setting value corresponding to the port 443 from "invalid" to "valid". Thereby, the plurality of setting values corresponding to the plurality of communication ports 80, 443, 21 of the printer 10 matches the plurality of setting values in the policy information PO1 (i.e., the plurality of setting values determined by the administrator). Then, in T34, the printer 10 sends a SET response to the server 100.

Upon receiving the SET response from the printer 10 in T34 (S42), the server 100 sends a Subscribe request to the printer 10 in T40 (S50).

Figure 5:
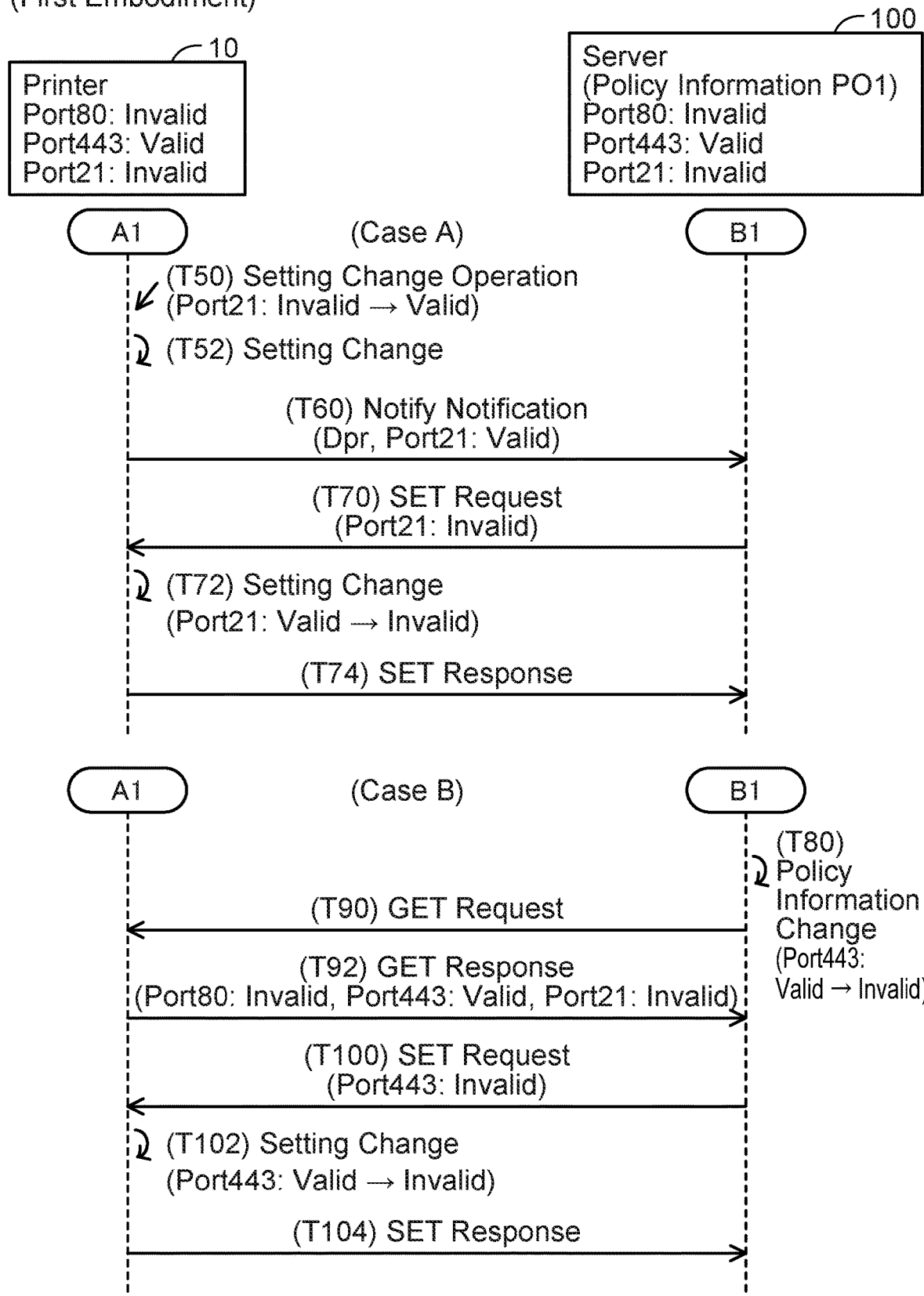
FIG. 5 shows a continuous sequence diagram from FIG. 4, showing cases A and B.

(Cases A and B which are Continuation of FIG. 4; FIG. 5)

Next, cases A and B which are a continuation of FIG. 4 will be described with reference to FIG. 5. In case A, the printer 10 accepts in T50 a setting change operation to change the setting value corresponding to the port 21 from "invalid" to "valid", for example, from a user different from the administrator of the printer 10. In this case, the printer 10 executes a setting change in T52 and sends in T60 to the server 100 a Notify notification including the device name "Dpr" and the port 21 "valid" in response to the Subscribe request received in T40 of FIG. 4.

Upon receiving the Notify notification from the printer 10 in T60 (YES in S60 of FIG. 3), the server 100 determines that the port 21 "valid" in the Notify notification does not match the port 21 "invalid" in the policy information PO1 associated with the device name "Dpr" in the Notify notification (NO in S70). In this case, in T70, the server 100 sends a SET request including the port 21 "invalid" to the printer 10 (S80).

Upon receiving the SET request from the server 100 in T70, the printer 10 executes a setting change in T72 in accordance with the SET request. Specifically, the printer 10 changes the setting value corresponding to the port 21 from "valid" to "invalid". Thereby, the plurality of setting values corresponding to the plurality of communication ports 80, 443, 21 of the printer 10 matches the plurality of setting values in the policy information PO1.

As described in case A above, even if the setting value of the printer 10 is changed by a user different from the administrator, the setting value of the printer 10 can be restored to its original value (i.e., the setting value determined by the administrator).

In case B, in a case of accepting a changing instruction for the policy information PO1 (YES in S100), the server 100 changes the setting value corresponding to the port 443 in the policy information PO1 from "valid" to "invalid" in T80. In this case, the server 100 sends a GET request to the printer 10 in T90 (S110) and receives a GET response from the printer 10 in T92 (S112). The GET response includes the port 80 "invalid", the port 443 "valid", and the port 21 "invalid".

The server 100 determines that the port 443 "valid" received in T92 does not match the port 443 "invalid" in the policy information PO1 (NO in S120). In this case, in T100, the server 100 sends a SET request including the port 443 "invalid" to the printer 10 (S130).

Upon receiving the SET request from the server 100 in T100, the printer 10 executes a setting change in T102 in accordance with the SET request. Specifically, the printer 10 changes the setting value corresponding to the port 443 from "valid" to "invalid". Thereby, the plurality of setting values corresponding to the plurality of communication ports 80, 443, 21 of the printer 10 matches the plurality of setting values in the policy information PO1. Next, in T104, the printer 10 sends a SET response to the server 100.

As described in case B above, in a case where the policy information PO1 is changed by the administrator, the setting value of the printer 10 can be changed appropriately.

(Effects of Present Embodiment)

According to the present embodiment, the server 100 sends the GET request or the Subscribe request to the printer 10 (S20, S50 of FIG. 2, S110 of FIG. 3), and upon receiving the setting value(s) from the printer 10 (S22, YES in S60, S112), the server 100 determines whether the received setting value(s) satisfies the policy information PO1 (S30, S70, S120). In a case of determining that the policy information PO1 is not satisfied (NO in S30, NO in S70, NO in S120), the server 100 sends the SET request to the printer 10 (S40, S80, S130). Thereby, the setting value(s) of the printer 10 is changed so as to satisfy the policy information PO1. On the other hand, in a case of determining that the policy information PO1 is satisfied (YES in S30, YES in S70, YES in S120), the server 100 does not send the SET request. Thus, the server 100 can appropriately switch whether or not to change the setting value(s) of the printer 10 depending on whether the received setting value(s) satisfies the policy information PO1.

The present embodiment is effective especially in a situation where the administrator manages a plurality of printers including the printer 10. That is, once the administrator registers the policy information PO1 in the server 100, the administrator can match the setting values of each of the plurality of printers to the setting values in the policy information PO1. Thus, the administrator does not have to operate each of the plurality of printers to input the setting values to the printer. It is possible to reduce workload of the administrator.

(Correspondence Relationships)

The printer 10 is an example of "communication device". The GET request and the Subscribe request are examples of "sending request". The port 80 and the port 443 are examples of "first setting item (and specific setting item)" and "second setting item", respectively. In the case of FIG. 4, the setting value "valid" corresponding to the port 80 and the setting value "invalid" corresponding to the port 443 of the printer 10 are examples of "first setting value (and specific setting value)" and "second setting value", respectively. The setting value "invalid" corresponding to the port 80 and the setting value "valid" corresponding to the port 443 in the policy information PO1 are examples of "first target value" and "second target value", respectively. The case where the policy information PO1 is changed in S100 of FIG. 3 is an example of "in a case where a second value is stored in place of a first value as the first target value". Determining YES in S30, S70, or S120 is an example of "satisfying first predetermined condition (and second predetermined condition)", and determining NO in S30, S70, or S120 is an example of "not satisfying first predetermined condition (and second predetermined condition)".

The SET request is an example of "first changing request" and "second changing request". For example, in a case where it is determined in S30 of FIG. 2 that each of the port 80 and the port 443 does not satisfy the policy information PO1, the SET request sent in S40 (i.e., the SET request for changing both the ports 80, 443) is an example of "the first changing request is a signal for requesting the communication device to change the first setting value to the first target value and to change the second setting value to the second target value". Further, in a case where it is determined in S30 of FIG. 2 that the port 80 does not satisfy the policy information PO1 and that the port 443 satisfies the policy information PO1, the SET request sent in S40 (i.e., the SET request for changing the port 80 and not changing the port 443) is an example of "the first changing request is a signal for requesting the communication device to change the first setting value to the first target value and not to change the second setting value". Further, in a case where it is determined in S30 of FIG. 2 that the port 80 satisfies the policy information PO1 and that the port 443 does not satisfy the policy information PO1, the SET request sent in S40 (i.e., the SET request for not changing the port 80 and for changing the port 443) is an example of "second changing request".

S20, S50 of FIG. 2, and S110 of FIG. 3 are examples of "sending a sending request to a communication device via the Internet". S22, YES in S60, and S112 are examples of "receiving the first setting value from the communication device via the Internet". S30, S70, and S120 are examples of "determining whether the received first setting value satisfies a first predetermined condition". S40, S80, and S130 are examples of "sending a first changing request to the communication device via the Internet". Further, S12 is an example "establishing a constant connection between the server and the communication device".

Second Embodiment

A second embodiment will be described. As shown in FIG. 1, in the present embodiment, the printer 10 adopts an administrator password as a setting item and stores a setting value corresponding to the administrator password. The administrator password is a setting item indicating whether a password needs to be inputted by the administrator in order to change a setting value corresponding to another setting item of the printer 10 (e.g., communication port, default printing condition, etc.), and either the setting value "ON" or "OFF" is stored. Here, the setting value "ON" means that input of a password is needed, and the setting value "OFF" means that input of a password is not needed. In a case where the setting value is "ON", the printer 10 further stores a password. The setting value "OFF" is stored at the stage of shipping the printer 10 (i.e., default setting value). Further, the policy information in the account table 128 of the server 100 includes a setting value corresponding to the administrator password.

In the present embodiment, in S20, S50 of FIGS. 2 and S110 of FIG. 3, a GET request or a Subscribe request that requests sending of the setting value corresponding to the administrator password is sent, and in S22, S60, and S112, the setting value corresponding to the administrator password is received. In S30, S70, and S120, it is determined whether the received setting value corresponding to the administrator password matches the setting value corresponding to the administrator password in the policy information PO1. Further, in S40, S80, and S130, a SET request for changing the setting value corresponding to the administrator password is sent.

Figure 6:
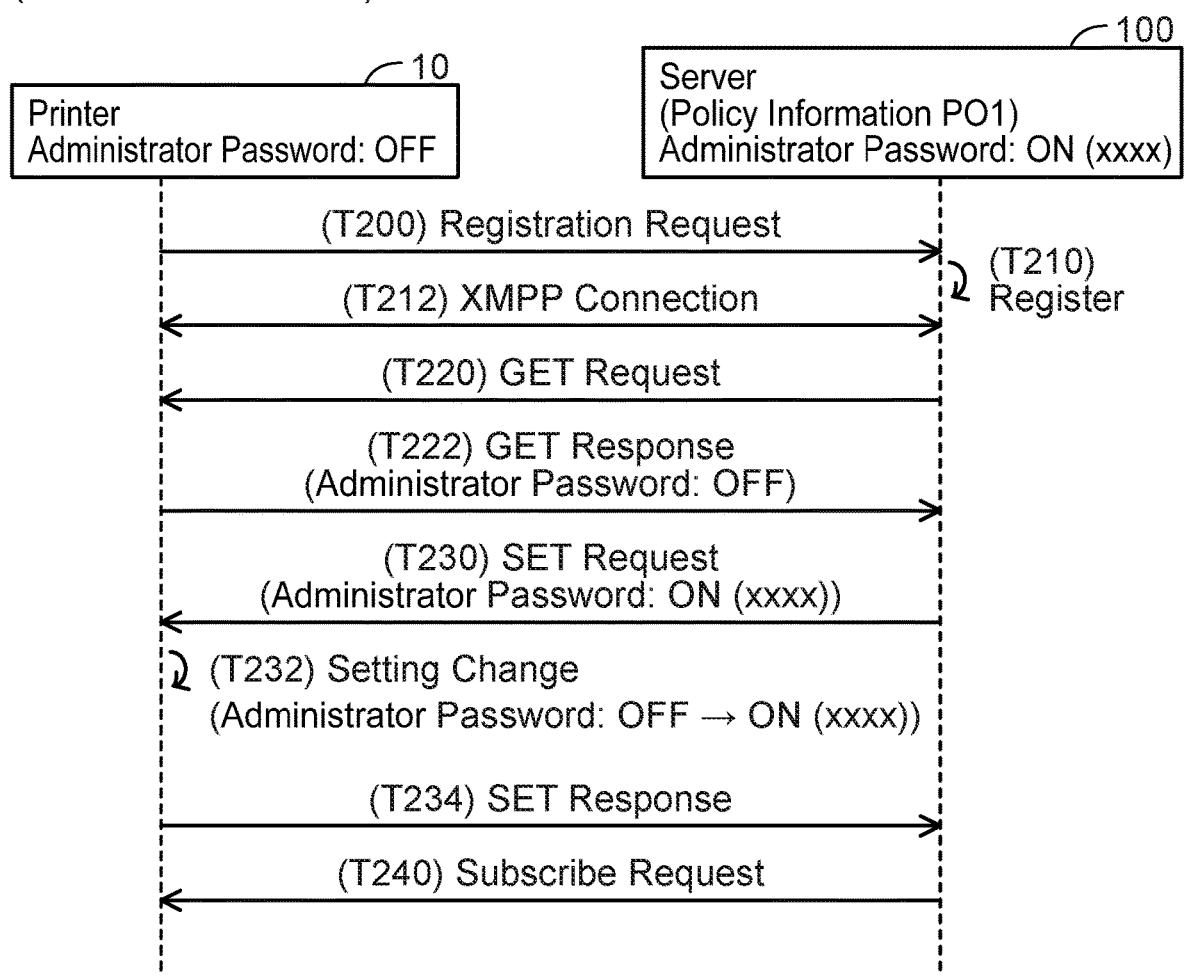
FIG. 6 shows a sequence diagram of a second embodiment.

(Specific Case; FIG. 6)

Next, a specific case realized by the present embodiment will be described with reference to FIG. 6. In an initial state of FIG. 6, the setting value corresponding to the administrator password of the printer 10 is the default value (i.e., "OFF"). Further, the policy information PO1 of the server 100 includes the setting value "ON" corresponding to the administrator password and further includes a password "xxxx".

T200 to T220 are the same as T0 to T20 of FIG. 4. In T222, the server 100 receives a GET response from the printer 10 (S22 of FIG. 2). The GET response includes the administrator password "OFF".

The server 100 determines that the administrator password "OFF" received in T222 does not match the administrator password "ON" in the policy information PO1 (NO in S30). In this case, in T230, the server 100 sends a SET request including the administrator password "ON" and the password "xxxx" to the printer 10 (S40).

Upon receiving the SET request from the server 100 in T230, the printer 10 changes the setting value corresponding to the administrator password from "OFF" to "ON" and further stores the password "xxxx" in T232. Thereby, the setting value of the printer 10 matches the setting value in the policy information PO1. Although not shown, the printer 10 requests input of the administrator password in a case of accepting an operation to change a setting value corresponding to a setting item different from the administrator password. The printer 10 changes the setting value in a case where a password matching the stored password "xxxx" is inputted, and does not change the setting value in a case where a password not matching the stored password "xxxx" is inputted. T234 and T240 are the same as T34 and T40 of FIG. 4.

In the present embodiment as well, the same effects as those in the first embodiment can be obtained. The administrator password is an example of "first setting item (and specific setting item)". In the case of FIG. 6, the setting value "OFF" of the printer 10 is an example of "first setting value (and specific setting value)". Further, the setting value "ON" in the policy information PO1 is an example of "first target value".

Third Embodiment; FIG. 7

A third embodiment will be described. As shown in FIG. 1, in the present embodiment, the printer 10 adopts an IP address as a setting item and stores a setting value "IPpr" corresponding to the IP address (i.e., value of the IP address). Further, as in the first embodiment, the printer 10 stores a plurality of setting values corresponding to the plurality of communication ports 80, 443, 21.

A private IP address or a global IP address is assigned as the IP address "IPpr". A global IP address is needed for communication via the Internet 8. Therefore, in a case where the IP address "IPpr" is a private IP address, the printer 10 is not accessed in an unauthorized manner via the Internet 8. On the other hand, in a case where the IP address "IPpr" is a global IP address, a signal including the IP address "IPpr" as its destination IP address may be sent from a device on the Internet 8. In this case, if the firewall function of the AP 6 is enabled, the signal is not received by the printer 10 and consequently an unauthorized access to the printer 10 does not occur. On the other hand, if the firewall function of the AP 6 is not enabled, the signal may be received by the printer 10. That is, an unauthorized access to the printer 10 may occur.

The policy information in the account table 128 of the server 100 already stores information related to the IP address. Specifically, the policy information includes either of execution information indicating that a global IP check is to be executed or non-execution information indicating that a global IP check is not to be executed. The global IP check is, in a case where the value of the IP address of the printer is the global IP address, to check whether the printer can be accessed via the Internet by using the value of that IP address without receiving a signal from the printer.

In the present embodiment, in S20, S50 of FIGS. 2 and S110 of FIG. 3, a GET request or a Subscribe request that request sending of the setting value corresponding to the IP address are sent, and in S22, S60, and S112, the setting value corresponding to the IP address (i.e., the IP address value "IPpr") is received.

In S30, S70, and S120, the CPU 122 determines whether the IP address value "IPpr" satisfies the policy information PO1. Specifically, in a case where the policy information PO1 is the non-execution information, the CPU 122 determines that the IP address value "IPpr" satisfies the policy information PO1 regardless of whether the IP address value "IPpr" is the global IP address (e.g., YES in S30). On the other hand, in a case where the policy information PO1 is the execution information, the CPU 122 executes the global IP check. The global IP check is executed as follows.

In the global IP check, the CPU 122 first determines whether the IP address value "IPpr" is a global IP address (may be called "GIP" below). GIPs are classified into class A to class C by JPNIC (Japan Network Information Center) which is an organization that manages GIPs. Ranges of GIPs of class A are "1.0.0.0 to 9.255.255.255" and "11.0.0.0 to 126.255.255.255", ranges of GIPs of class B are "128.0.0.0 to 172.15.255.255" and "172.32.0.0 to 191.255.255.255", and ranges of GIPs of class C are "192.0.0.0 to 192.167.255.255" and "192.169.0.0 to 223.255.255.255". In a case where the IP address value "IPpr" is not an address in the aforementioned ranges of GIPs, the CPU 122 determines that the IP address value "IPpr" is not a GIP (i.e., determines that the IP address value is a private IP address). In this case, the CPU 122 determines that the IP address value "IPpr" satisfies the policy information (e.g., YES in S30). On the other hand, in a case where the IP address value "IPpr" is an address in the aforementioned ranges of GIPs, the CPU 122 determines that the IP address value "IPpr" is a GIP. In this case, the CPU 122 further executes a communication confirmation using the IP address value "IPpr". The communication confirmation is executed as follows.

In the communication confirmation, the CPU 122 determines whether the printer 10 can be accessed via the Internet 8 by using the IP address value "IPpr" without receiving a signal from the printer 10. Specifically, the CPU 122 sends via the Internet 8 an HTTP (abbreviation of Hyper Text Transfer Protocol) request including the IP address value "IPpr" as its destination IP address. In a case of not receiving an HTTP response including the IP address value "IPpr" as its source IP address, the CPU 122 determines that the printer 10 cannot be accessed. In this case, the CPU 122 determines that the IP address value "IPpr" satisfies the policy information PO1 (e.g., YES in S30). On the other hand, in a case of receiving an HTTP response including the IP address value "IPpr" as its source IP address from the printer 10 via the Internet 8, the CPU 122 determines that the printer 10 can be accessed. In this case, the CPU 122 determines that the IP address value "IPpr" does not satisfy the policy information PO1 (e.g., NO in S30). That is, in the case where the IP address value "IPpr" does not satisfy the policy information PO1, the printer 10 may be accessed in an unauthorized manner via the Internet 8. In order to correct such a situation, S40, S80, and S130 are executed.

In S40, S80, and S130, the CPU 122 sends, to the printer 10, a SET request for setting all of the plurality of communication ports 80, 443, 21 to "invalid". Thereby, all the communication ports 80, 443, 21 in the printer 10 are set to "invalid", and thus an unauthorized access to the printer 10 can be prevented.

(Specific Case; FIG. 7)

Next, a specific case realized by the present embodiment will be described with reference to FIG. 7. In an initial state of FIG. 7, each of the plurality of setting values corresponding to the plurality of communication ports 80, 443, 21 of the printer 10 is the default value (i.e., the port 80 "valid", the port 443 "invalid", and the port 21 "invalid"). The IP address value "IPpr" of the printer 10 is a GIP. Further, the policy information PO1 of the server 100 is the execution information indicating that the global IP check is to be executed.

T300 to T320 are the same as T0 to T20 of FIG. 4. In T322, the server 100 receives a GET response from the printer 10 (S22 of FIG. 2). The GET response includes the IP address value "IPpr" of the printer 10.

Since the policy information PO1 is the execution information, the server 100 executes the global IP check. That is, the server 100 first determines that the IP address value "IPpr" is a GIP and then, in T330, sends an HTTP request including the IP address value "IPpr" as the destination IP address. Since the server 100 receives an HTTP response from the printer 10 in T332, the server 100 determines that the IP address value "IPpr" does not satisfy the policy information PO1 (NO in S30). In this case, the server 100 sends, to the printer 10, a SET request for setting all of the plurality of communication ports 80, 443, 21 to "invalid" in T340 (S40).

Upon receiving the SET request from the server 100 in T340, the printer 10 changes the setting value corresponding to the port 80 from "valid" to "invalid" in T342. Moreover, since the ports 443, 21 are already set to "invalid", the setting values corresponding to the ports 443, 21 are not changed. T344 and T350 are the same as T34 and T40 of FIG. 4.

In the present embodiment as well, the same effects as those of the first embodiment can be obtained. The IP address is an example of "first setting item", and the IP address value "IPpr" is an example of "first setting value". In the case of FIG. 7, the port 80 is an example of "specific setting item", and the setting value "valid" corresponding to the port 80 is an example of "specific setting value".

(Variant 1) The policy information PO1 is not limited to those described in the aforementioned embodiments. For example, the following variants 1-1 and 1-2 may be adopted.

(Variant 1-1) The policy information PO1 may be information indicating that firmware of the printer 10 is to be set to its latest version. In this case, for example, sending of a setting value corresponding to the firmware of the printer 10 (i.e., current version information of the firmware) is requested in S20 of FIG. 2, and it is determined whether the version information is the latest version in S30. YES is determined in S30 in a case where the version information is the latest version, and NO is determined in S30 in a case where the version information is not the latest version. In S40, the firmware of the latest version may be sent to the printer 10, or an instruction indicating that the firmware of the latest version should be downloaded from an external server may be sent to the printer 10. In the present variant, the firmware and the version information are examples of "first setting item (and specific setting item)" and "first setting value (and specific setting value)", respectively. Further, the case where the version information is the latest version and the case where the version information is not the latest version are examples of "satisfying first predetermined condition" and "not satisfying first predetermined condition", respectively.

(Variant 1-2) The policy information PO1 may be information indicating encryption of communication executed by the printer 10. In this case, for example, sending of a setting value corresponding to an encrypted communication setting of the printer 10 (i.e., information indicating whether encrypted communication is to be executed (may be called "encryption information" below)) is requested in S20 of FIG. 2, and it is determined whether the encryption information indicates that encrypted communication is to be executed in S30. YES is determined in S30 in a case where the encryption information indicates that encrypted communication is to be executed, and NO is determined in S30 in a case where the encryption information indicates that encrypted communication is not to be executed. In S40, a SET request is sent to the printer 10. This SET request is for changing the setting value corresponding to the encrypted communication setting from a value for not executing encrypted communication to a value for executing encrypted communication. In the present variant, the encrypted communication setting and the encryption information are examples of "first setting item (and specific setting item)" and "first setting value (and specific setting value)", respectively. Further, the case where the encryption information indicates the encrypted communication is to be executed and the case where the encryption information indicates the encrypted communication is not to be executed are examples of "satisfying first predetermined condition" and "not satisfying first predetermined condition", respectively.

(Variant 2) In S40 of FIG. 2 of the third embodiment, the CPU 122 may send to the printer 10 a SET request for instructing the IP address of the printer 10 to be changed from a global IP address to a private IP address (e.g., a predetermined value), instead of the SET request for setting the communication ports to "invalid". Generally speaking, in a situation where "first setting item" is "an item corresponding to an IP address of the communication device", "specific setting item" may be the same as "first setting item".

(Variant 3) "Constant connection" is not limited to the XMPP connection, and may be another type of connection. Generally speaking, "constant connection" may be any connection by which a server can send a sending request to a communication device without receiving a signal from the communication device.

(Variant 4) S20 to S42 of FIG. 2 may be omitted. In another variant, S50 of FIG. 2 and S60 to S82 of FIG. 3 may be omitted. Further, in yet another variant, S100 to S132 of FIG. 3 may be omitted.

(Variant 5) "Communication device" is not limited to the printer 10, and includes devices such as a scanner, a copy machine, a multi-function device, a server, a PC, a smartphone, etc.

(Variant 6) In each of the above embodiments, the respective processes executed by the server 100 are implemented by software (i.e., the program 126). Instead of this, one or more of the processes may be implemented by hardware such as a logic circuit.

What is claimed is:

1. A non-transitory computer-readable medium storing computer-readable instructions for a server,
the computer-readable instructions, when executed by a processor of the server, causing the server to:
send a sending request to a communication device via the Internet, the sending request being a signal for requesting the communication device to send a first setting value corresponding to a first setting item of the communication device;
after the sending request has been sent to the communication device, receive the first setting value from the communication device via the Internet;
determine whether the received first setting value satisfies a first predetermined condition; and
in a case where it is determined that the received first setting value does not satisfy the first predetermined condition, send a first changing request to the communication device via the Internet, the first changing request being a signal for requesting the communication device to change a specific setting value corresponding to a specific setting item of the communication device, wherein in a case where it is determined that the received first setting value satisfies the first predetermined condition, the first changing request is not sent.

2. The non-transitory computer-readable medium as in claim 1, wherein
the specific setting item is identical to the first setting item,
the specific setting value is identical to the first setting value,
the server comprises a memory storing a first target value corresponding to the first setting item,
it is determined that the first predetermined condition is satisfied in a case where the received first setting value matches the first target value in the memory,
it is determined that the first predetermined condition is not satisfied in a case where the received first setting value does not match the first target value in the memory, and the first changing request is a signal for requesting the communication device to change the first setting value corresponding to the first setting item to the first target value.

3. The non-transitory computer-readable medium as in claim 2, wherein
the first setting item is an item corresponding to a communication port of the communication device,
the first setting value includes any one of a value indicating a valid setting of the communication port and a value indicating an invalid setting of the communication port, and
the target setting value includes any one of a value indicating a valid setting of the communication port and a value indicating an invalid setting of the communication port.

4. The non-transitory computer-readable medium as in claim 2, wherein
the first setting item is an item corresponding to authentication information of the communication device,
the first setting value includes any one of a value indicating that the authentication information is used when the communication device is used and a value indicating that the authentication information is not used when the communication device is used, and
the first target value includes any one of a value indicating that the authentication information is used when the communication device is used and a value indicating that the authentication information is not used when the communication device is used.

5. The non-transitory computer-readable medium as in claim 2, wherein
the sending request is sent to the communication device in a case where a second value is stored in place of a first value as the first target value in the memory.

6. The non-transitory computer-readable medium as in claim 2, wherein
the memory further stores a second target value corresponding to a second setting item different from the first setting item,
the sending request is a signal for requesting the communication device to send the first setting value corresponding to the first setting item of the communication device and a second setting value corresponding to the second setting item of the communication device,
the computer-readable instructions, when executed by the processor, further cause the server to:
after the sending request has been sent to the communication device, receive the second setting value from the communication device via the Internet;
determine whether the received second setting value satisfies a second predetermined condition,
wherein it is determined that the second predetermined condition is satisfied in a case where the received second setting value matches the second target value in the memory, and
it is determined that the second predetermined condition is not satisfied in a case where the received second setting value does not match the second target value in the memory; and
in a case where it is determined that the received first setting value satisfies the first predetermined condition and it is determined that the received second setting value does not satisfy the second predetermined condition, send a second changing request to the communication device, the second changing request is a signal for requesting the communication device not to change the first setting value corresponding to the first setting item and to change the second setting value corresponding to the second setting item to the second target value,
wherein in a case where it is determined that the received first setting value does not satisfy the first predetermined condition and it is determined that the received second setting value does not satisfy the second predetermined condition, the first changing request is sent that is a signal for requesting the communication device to change the first setting value corresponding to the first setting item to the first target value and to change the second setting value corresponding to the second setting item to the second target value,
in a case where it is determined that the received first setting value does not satisfy the first predetermined condition and it is determined that the received second setting value satisfies the second predetermined condition, the first changing request is sent that is a signal for requesting the communication device to change the first setting value corresponding to the first setting item to the first target value and not to change the second setting value corresponding to the second setting item.

7. The non-transitory computer-readable medium as in claim 1, wherein
the first setting item is an item corresponding to an IP address of the communication device,
the first setting value is a value of the IP address of the communication device,
it is determined that the first predetermined condition is satisfied in a case where a device on the Internet is incapable of accessing the communication device via the Internet by using the value of the IP address which is the first setting value without receiving a signal from the communication device, and
it is determined that the first predetermined condition is not satisfied in a case where a device on the Internet is capable of accessing the communication device via the Internet by using the value of the IP address which is the first setting value without receiving a signal from the communication device.

8. The non-transitory computer-readable medium as in claim 7, wherein
the specific setting item is different from the first setting item, and
the specific setting value is different from the first setting value.

9. The non-transitory computer-readable medium as in claim 1 wherein
the computer-readable instructions, when executed by the processor, further cause the server to:
establish a constant connection between the server and the communication device,
wherein the sending request is sent to the communication device by using the constant connection without the server receiving a signal from the communication device.

10. A server comprising:
a processor; and
a memory storing computer-readable instructions therein, the computer-readable instructions, when executed by the processor, causing the server to:
send a sending request to a communication device via the Internet, the sending request being a signal for requesting the communication device to send a first setting value corresponding to a first setting item of the communication device;

after the sending request has been sent to the communication device, receive the first setting value from the communication device via the Internet;
determine whether the received first setting value satisfies a first predetermined condition; and
in a case where it is determined that the received first setting value does not satisfy the first predetermined condition, send a first changing request to the communication device via the Internet, the first changing request being a signal for requesting the communication device to change a specific setting value corresponding to a specific setting item of the communication device, wherein in a case where it is determined that the received first setting value satisfies the first predetermined condition, the first changing request is not sent.

11. The server as in claim 10, wherein
the specific setting item is identical to the first setting item,
the specific setting value is identical to the first setting value,
the server comprises a memory storing a first target value corresponding to the first setting item,
it is determined that the first predetermined condition is satisfied in a case where the received first setting value matches the first target value in the memory,
it is determined that the first predetermined condition is not satisfied in a case where the received first setting value does not match the first target value in the memory, and
the first changing request is a signal for requesting the communication device to change the first setting value corresponding to the first setting item to the first target value.

12. The server as in claim 11, wherein
the first setting item is an item corresponding to a communication port of the communication device,
the first setting value includes any one of a value indicating a valid setting of the communication port and a value indicating an invalid setting of the communication port, and
the target setting value includes any one of a value indicating a valid setting of the communication port and a value indicating an invalid setting of the communication port.

13. The server as in claim 11, wherein
the first setting item is an item corresponding to authentication information of the communication device,
the first setting value includes any one of a value indicating that the authentication information is used when the communication device is used and a value indicating that the authentication information is not used when the communication device is used, and
the first target value includes any one of a value indicating that the authentication information is used when the communication device is used and a value indicating that the authentication information is not used when the communication device is used.

14. The server as in claim 11, wherein
the sending request is sent to the communication device in a case where a second value is stored in place of a first value as the first target value in the memory.

15. The server as in claim 11, wherein
the memory further stores a second target value corresponding to a second setting item different from the first setting item,
the sending request is a signal for requesting the communication device to send the first setting value corresponding to the first setting item of the communication device and a second setting value corresponding to the second setting item of the communication device,
the computer-readable instructions, when executed by the processor, further cause the server to:
after the sending request has been sent to the communication device, receive the second setting value from the communication device via the Internet;
determine whether the received second setting value satisfies a second predetermined condition,
wherein it is determined that the second predetermined condition is satisfied in a case where the received second setting value matches the second target value in the memory, and
it is determined that the second predetermined condition is not satisfied in a case where the received second setting value does not match the second target value in the memory; and
in a case where it is determined that the received first setting value satisfies the first predetermined condition and it is determined that the received second setting value does not satisfy the second predetermined condition, send a second changing request to the communication device, the second changing request is a signal for requesting the communication device not to change the first setting value corresponding to the first setting item and to change the second setting value corresponding to the second setting item to the second target value,
wherein in a case where it is determined that the received first setting value does not satisfy the first predetermined condition and it is determined that the received second setting value does not satisfy the second predetermined condition, the first changing request is sent that is a signal for requesting the communication device to change the first setting value corresponding to the first setting item to the first target value and to change the second setting value corresponding to the second setting item to the second target value,
in a case where it is determined that the received first setting value does not satisfy the first predetermined condition and it is determined that the received second setting value satisfies the second predetermined condition, the first changing request is sent that is a signal for requesting the communication device to change the first setting value corresponding to the first setting item to the first target value and not to change the second setting value corresponding to the second setting item.

16. The server as in claim 10, wherein
the first setting item is an item corresponding to an IP address of the communication device,
the first setting value is a value of the IP address of the communication device,
it is determined that the first predetermined condition is satisfied in a case where a device on the Internet is incapable of accessing the communication device via the Internet by using the value of the IP address which is the first setting value without receiving a signal from the communication device, and
it is determined that the first predetermined condition is not satisfied in a case where a device on the Internet is capable of accessing the communication device via the Internet by using the value of the IP address which is the first setting value without receiving a signal from the communication device.

17. The server as in claim 16, wherein the specific setting item is different from the first setting item, and the specific setting value is different from the first setting value.

18. The server as in claim 10 wherein the computer-readable instructions, when executed by the processor, further cause the server to:

establish a constant connection between the server and the communication device, wherein the sending request is sent to the communication device by using the constant connection without the server receiving a signal from the communication device.

19. A method executed by a server, the method comprising:

sending a sending request to a communication device via the Internet, the sending request being a signal for requesting the communication device to send a first setting value corresponding to a first setting item of the communication device;

after the sending request has been sent to the communication device, receiving the first setting value from the communication device via the Internet;

determining whether the received first setting value satisfies a first predetermined condition; and in a case where it is determined that the received first setting value does not satisfy the first predetermined condition, sending a first changing request to the communication device via the Internet, the first changing request being a signal for requesting the communication device to change a specific setting value corresponding to a specific setting item of the communication device, wherein in a case where it is determined that the received first setting value satisfies the first predetermined condition, the first changing request is not sent.

* * * * *